(12) United States Patent
Montalvo et al.

(10) Patent No.: US 11,444,669 B2
(45) Date of Patent: *Sep. 13, 2022

(54) DIGITAL BEAMFORMING FOR CELLULAR TECHNOLOGY APPLICATIONS

(71) Applicant: Analog Devices, Inc., Wilmington, MA (US)

(72) Inventors: Antonio Montalvo, Raleigh, NC (US); David J. McLaurin, Durham, NC (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,509

(22) Filed: Jul. 9, 2021

(65) Prior Publication Data
US 2021/0391905 A1    Dec. 16, 2021

Related U.S. Application Data

(63) Continuation of application No. 16/902,769, filed on Jun. 16, 2020, now Pat. No. 11,095,350.

(51) Int. Cl.
    *H04B 7/06* (2006.01)
(52) U.S. Cl.
    CPC ................... *H04B 7/0617* (2013.01)
(58) Field of Classification Search
    CPC .................................................. H04B 7/0617
    USPC ......................................................... 375/295
    See application file for complete search history.

(56) References Cited

U.S. PATENT DOCUMENTS

| 11,095,350 B1* | 8/2021 | Montalvo | H04B 7/0617 |
| 2002/0154687 A1 | 10/2002 | Bierly et al. | |
| 2014/0341261 A1* | 11/2014 | Weiler | H04W 76/10 |
| | | | 375/296 |
| 2019/0089434 A1 | 3/2019 | Rainish et al. | |

OTHER PUBLICATIONS

Extended European Search Report dated Oct. 26, 2021 in EP21179120.7, 9 pages.

* cited by examiner

*Primary Examiner* — Fitwi Y Hailegiorgis
(74) *Attorney, Agent, or Firm* — Akona IP

(57) ABSTRACT

Embodiments of the present disclosure relate to cellular technology applications of beamforming performed in the digital domain. In one aspect, an RF system for performing digital beamforming on a per-carrier basis is disclosed, where different phase and/or amplitude adjustments are applied to signals of different frequency ranges (i.e., to different carrier signals). In another aspect, an RF system for performing digital beamforming on a per-antenna basis is disclosed, where different phase and/or amplitude adjustments are applied to signals transmitted from or received by different antennas. In some embodiments, an RF system may be configured to implement both digital beamforming on a per-carrier basis and digital beamforming on a per-antenna basis. The RF systems disclosed herein allow implementing programmable beamforming in the digital domain in a manner that is significantly less complex than conventional implementations.

19 Claims, 7 Drawing Sheets

DIGITAL BEAMFORMING FOR CELLULAR TECHNOLOGY APPLICATIONS

CROSS-REFERENCE TO RELATED APPLICATIONS

This application is a continuation and claims the benefit of priority under 35 U.S.C. 120 of U.S. Non-Provisional patent application Ser. No. 16/902,769, filed 16 Jun. 2020, entitled "DIGITAL BEAM FORMING FOR CELLULAR TECHNOLOGY APPLICATIONS," the disclosure of which is considered part of and is incorporated hereby by reference in its entirety.

TECHNICAL FIELD OF THE DISCLOSURE

The present disclosure generally relates to radio frequency (RF) systems and, more particularly, to systems and methods for realizing digital beamforming in cellular applications.

BACKGROUND

Radio systems are systems that transmit and receive signals in the form of electromagnetic waves in the RF range of approximately 3 kilohertz (kHz) to 300 gigahertz (GHz). In context of RF systems, an antenna is a device that serves as an interface between radio waves propagating wirelessly through space and electric currents moving in metal conductors used in a transmitter or a receiver. During transmission, a radio transmitter supplies an electric current to the antenna's terminals, and the antenna radiates the energy from the current as radio waves. During reception, an antenna intercepts some of the power of a radio wave in order to produce an electric current at its terminals, which current is subsequently applied to a receiver to be amplified. Antennas are essential components of all radio equipment, and are used in cell phones, satellite communications, radio broadcasting, broadcast television, two-way radio, communications receivers, radar, and other devices.

A single antenna will typically broadcast a radiation pattern that radiates equally in all directions in a spherical wavefront. Phased antenna arrays generally refer to a collection of antennas (also referred to as "antenna elements") that are used to focus electromagnetic energy in a particular direction, thereby creating a main beam, a process commonly referred to as "beamforming." Phased antenna arrays offer numerous advantages over single antenna systems, such as high gain, ability to perform directional steering, and simultaneous communication. Therefore, phased antenna arrays are being used more frequently in a myriad of different applications, such as airplane, automotive and industrial radar, cellular technology, Wi-Fi and other short-range communication technologies, and military applications.

Implementing beamforming in cellular technology applications presents unique challenges not found in other applications. One reason for that is the requirement for cellular devices to transmit and receive different carrier signals (i.e., signals in different frequency bands). As a result, designing an optimal RF transceiver (i.e., an RF device that can both send and receive RF signals having information encoded therein), capable of performing desired beamforming for cellular technology applications is far from trivial. A variety of factors can affect the cost, quality and robustness of a beamforming arrangement employed in such a transceiver. Physical limitations such as space/surface area, as well as limitations that may be imposed by regulations, can pose further constraints to the requirements or specifications of beamforming in cellular technology applications, and, thus, trade-off and ingenuity must be exercised.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
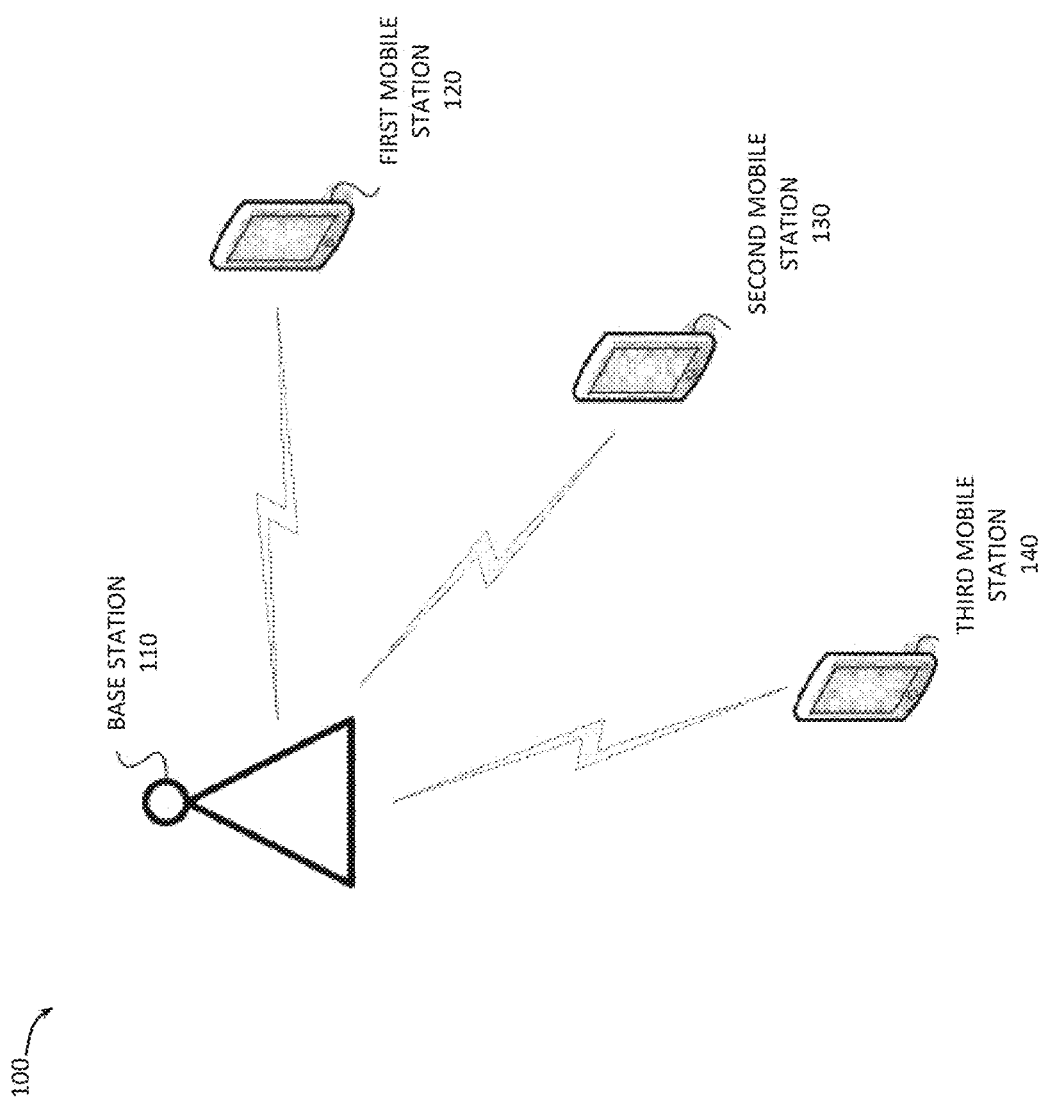
FIG. 1 illustrates an example cellular wireless communication system, according to some embodiments of the present disclosure.

The systems, methods, and devices of this disclosure each have several innovative aspects, no single one of which is solely responsible for all of the desirable attributes disclosed herein. Details of one or more implementations of the subject matter described in the present disclosure are set forth in the description below and the accompanying drawings.

For purposes of illustrating RF systems (e.g., RF transceivers) configured to implement digital beamforming for cellular technology applications, proposed herein, it might be useful to first understand phenomena that may come into play in such systems. The following foundational information may be viewed as a basis from which the present disclosure may be properly explained. Such information is offered for purposes of explanation only and, accordingly, should not be construed in any way to limit the broad scope of the present disclosure and its potential applications.

As described above, phased antenna arrays generally refer to a collection of antennas that are used to focus RF energy in a particular direction, thus creating a main beam. In particular, the individual antennas of a phased antenna array may radiate electromagnetic waves in a spherical pattern, but, collectively, a plurality of such antennas may be configured to generate a wavefront in a particular direction through constructive and destructive interference between the waves of the same, or substantially the same, frequency emitted by different antennas. Beamforming involves adjusting phases and/or amplitudes of the signals transmitted by different antennas (the terms "waves" and "signals" may be used interchangeably herein). The phase of the signals transmitted by the antennas of a phased antenna array affects whether the signals interfere constructively or destructively, thus allowing the antenna system to steer the wavefront in different directions. The radiation patterns of the antennas may interfere constructively in a target direction, creating a wavefront in that direction (i.e., the main beam). A phased antenna array can realize increased gain and improve signal to interference plus noise ratio in the direction of the main beam. Furthermore, the radiation patterns of the antennas may interfere destructively in directions other than the direction of the main beam and can reduce gain in those directions (the terms "gain" and "amplitude" may also be used interchangeably herein). The amplitude of the signals transmitted by the individual antennas of a phased antenna array affects side lobe levels, where the side lobes are lobes of the radiation patterns that are not in the direction of the main beam (or main lobe). It is generally preferable to reduce side lobe levels such that the antenna system can focus the cumulative radiation pattern to the target direction.

As the foregoing illustrates, the accuracy of the control in-phase shift and amplitude (or gain) for the collection of antennas is important to the implementation of phased antenna arrays.

Controlling phase and amplitude of signals used for beamforming in cellular technology applications presents challenges that are not found in other beamforming applications. Cellular technology is constantly evolving to support growing widespread wireless technology usage. Recently, popular wireless standardized technology has progressed from Global System for Mobile Communication (GSM) to Wideband Code Division Multiple Access (WCDMA) to Long Term Evolution (LTE). Cellular systems are deployed in many frequency bands that are defined by a combination of standardization organizations such as the 3d Generation Partnership Project (3GPP) and government-sponsored agencies such as the Federal Communications Commission (FCC). There are both frequency division duplex (FDD) and time division duplex (TDD) variants of frequency allocations that are used in commercial cellular networks. In FDD systems, the uplink and downlink use separate frequency bands at the same time while, in TDD systems, the uplink and downlink use the same frequencies at different times. Base station transceivers capable of receiving multiple frequency bands with a single signal path (i.e., multi-band transceivers) have now become commonplace. These multi-band transceivers have the potential of advantageously lower cost and smaller size as compared to systems utilizing separate transceivers dedicated to each band.

The inventors of the present disclosure realized that implementing beamforming for cellular technology applications is challenging because signals of different frequencies (i.e., different carrier signals) are involved, as is the case with multi-band transceivers or when, even within a single frequency band, a single operator may have licenses to non-contiguous spectrum within the band. The inventors of the present disclosure further realized that, even without the challenge of beamforming in presence of different carrier signals, conventional approaches to performing beamforming individually for each antenna of a phased antenna array used in a cellular wireless system leave much to be desired. For example, conventional approaches to performing beamforming in the analog domain do not allow for carrier-specific beamforming and one digital data path is shared by many power amplifiers which makes performing digital predistortion (DPD) complex or altogether impossible, while conventional approaches to performing beamforming for cellular applications in the digital domain result in RF transceivers that are extremely complex and oftentimes not feasible.

Embodiments of the present disclosure relate to cellular technology applications of beamforming performed in the digital domain (i.e., digital beamforming). In one aspect, an RF system (e.g., an RF transceiver) for performing digital beamforming on a per-carrier basis is disclosed, where different phase and/or amplitude adjustments are applied to signals of different frequency ranges (e.g., to different carrier signals). In another aspect, an RF system (e.g., an RF transceiver) for performing digital beamforming on a per-antenna basis is disclosed, where different phase and/or amplitude adjustments are applied to signals transmitted from or received by different antennas of an antenna array. As used herein, referring to digital beamforming as being performed on a "per-carrier basis" means that different carrier signals may be steered in different directions. On the other hand, referring to digital beamforming as being performed on a "per-antenna basis" means that each radiating element (e.g., each antenna element described herein) has an associated digital beamformer. This is in contrast to hybrid analog/digital beamforming in which a digital beamformer may be associated with many radiating elements, each of which has an analog beamformer associated with it. In some embodiments, an RF system may be configured to implement both digital beamforming on a per-carrier basis and digital beamforming on a per-antenna basis. The RF systems disclosed herein allow implementing programmable beamforming for cellular applications in the digital domain in a manner that is significantly less complex than conventional implementations.

As will be appreciated by one skilled in the art, aspects of the present disclosure, in particular aspects of per-carrier and/or per-antenna digital beamforming for cellular wireless communications as proposed herein, may be embodied in various manners—e.g., as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing RF transmitters, receivers, transceivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the select examples. For example, various embodiments of digital beamforming are described herein with reference to TDD systems because beamforming may be easier to illustrate since channels of TDD systems are reciprocal (e.g., the same channels may be used for the downlink and the uplink signals so the same beamformer weights may be used for downlink and uplink). However, digital beamforming techniques disclosed herein are equally applicable to FDD systems with modifications that would be apparent to a person of ordinary skill in the art based on the descriptions provided herein, all of which systems being, therefore, within the scope of the present disclosure.

In the following description, reference is made to the drawings, where like reference numerals can indicate identical or functionally similar elements. It will be understood that elements illustrated in the drawings are not necessarily drawn to scale. Moreover, some embodiments can incorporate any suitable combination of features from two or more drawings. Further, it will be understood that certain embodiments can include more elements than illustrated in a drawing and/or a subset of the elements illustrated in a drawing. In general, while some drawings provided herein illustrate various aspects of RF systems configured to implement per-carrier and/or per-antenna digital beamforming for cellular wireless communications, details of these systems may be different in different embodiments. For example, further details shown in the drawings, such as the particular arrangement of the transceivers of the transceiver array 230, antennas of the antenna array 250, and the relation between the transceivers of the transceiver array 230 and the antennas of the antenna array 250 may be different in different embodiments, with the illustrations of the present drawings providing only some examples of how these components may be used together in an RF system. In another example, although some embodiments shown in the present drawings illustrate a certain number of components (e.g., a certain number of channels, transceivers and antennas), it is understood that these embodiments may be implemented in RF systems with any number of these components in accordance with the descriptions provided herein. Furthermore, although the disclosure may discuss certain embodiments as one type of components of an RF system, it is understood that the embodiments disclosed herein may be implemented with different types of components of an RF system (e.g., beamformers described herein may be time domain beamformers or frequency domain beamformers, antenna arrays described herein may be dynamic antenna arrays, passive antenna arrays, and the like).

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the terms "circuit" or "circuitry" (which may be used interchangeably) refer to one or more passive and/or active components that are arranged to cooperate with one another to provide a desired function. Sometimes, in the present descriptions, the term "circuit" may be omitted (e.g., an upconverter and/or downconverter circuit may be referred to simply as an upconverter and/or downconverter, etc.). If used, the terms "substantially," "approximately," "about," etc., may be used to generally refer to being within +/−20% of a target value, e.g., within +/−10% of a target value, based on the context of a particular value as described herein or as known in the art.

Example Cellular Wireless Communication System

FIG. 1 illustrates a wireless communication system 100, according to some embodiments of the present disclosure, in which various embodiments of per-carrier and/or per-antenna digital beamforming as described herein may be implemented. The wireless communication system 100 may include a base station 110 and a plurality of mobile stations, examples of which are shown in FIG. 1 as a first mobile station 120, a second mobile station 130, and a third mobile station 140. The base station 110 may be coupled to a backend network (not shown) of the wireless communication system and may provide communication between the mobile stations 120-140 and the backend network. In various embodiments, the wireless communication system 100 may include a plurality of base stations similar to the base station 110, which base stations may, e.g., be arranged in cells, where only one base station 110 is shown in FIG. 1 for simplicity and illustration purposes.

The base station 110 may support wireless communication with mobile stations 120-140 of various standard technologies as well as in multiple bands. For example, the base station 110 may support LTE, WCDMA, and GSM standard communication. Each of the mobile stations 120-140 may support any one or more of these standards. However, the use of these listed standards is merely exemplary and other standards also may be supported by different parts of the wireless communication system 100. The base station 110 may transmit signals to the mobile stations 120-140 in downlink signals and receive signals from the mobile stations 120-140 in uplink signals. For example, the base station 110 may receive LTE compliant signals from the first mobile station 120, WCDMA signals from the second mobile station 130, and GSM signals from the third mobile station 140. The base station 110 may convert the received RF signals to baseband signals, possibly by first converting them to intermediate frequency (IF) signals, or low-IF signals, to demodulate and extract information from the received signals.

Figure 2:
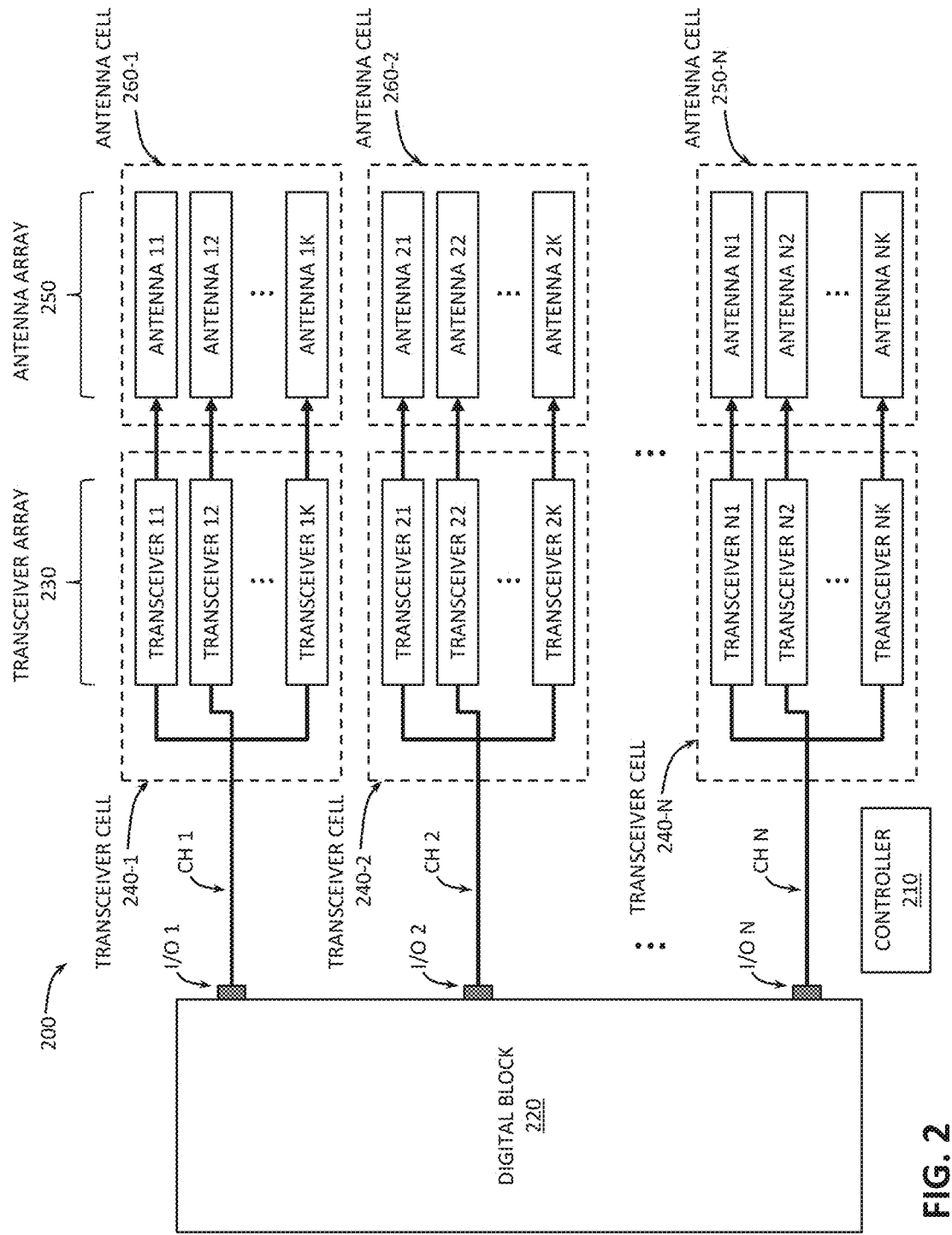
FIG. 2 provides a block diagram illustrating an example RF system configured to implement per-carrier and/or per-antenna digital beamforming for cellular wireless communications, according to some embodiments of the present disclosure.

Example RF System for Implementing Per-Carrier and/or Per-Antenna Digital Beamforming FIG. 2 provides a block diagram illustrating an example RF transceiver system 200 configured to implement per-carrier and/or per-antenna digital beamforming for cellular wireless communications, according to some embodiments of the present disclosure. The RF transceiver system 200 may be interchangeably referred to as an "RF transceiver system" 200. In various embodiments, the RF transceiver system 200 may be provided in the base station 110 of FIG. 1 and/or in any of the mobile stations 120-140 of FIG. 1.

As shown in FIG. 2, the RF transceiver system 200 may include a controller 210, a digital block 220, a transceiver array 230, and an antenna array 250.

In various embodiments, the controller 210 may either be included within the RF transceiver system 200, or be external, but communicatively coupled, to the RF transceiver system 200. The controller 210 may include any suitable device, configured to control operation of various parts of the RF transceiver system 200. For example, in various embodiments, the controller 210 may control one or more of the amount and the timing of phase shifting implemented in the RF transceiver system 200, the amount and the timing of gain adjustments implemented in the RF transceiver system 200, the frequencies of RF signals to which the baseband signals are to be upconverted for wireless transmission, etc. In some embodiments, the controller 210 may be configured to enable various components of the RF transceiver system 200 to function as described herein in order to carry out per-carrier and/or per-antenna digital beamforming for cellular wireless communications. In some embodiments, the controller 210 may further control other aspects, components, and features of the RF transceiver system 200, described herein. In some embodiments, the controller 210 may be implemented as, or include portions of, a data processing system shown in FIG. 7.

The digital block 220 may be configured to perform various functions related to digital processing of the TX signals so that information can be encoded in the TX signals and to perform various functions related to digital processing of the receive (RX) signals so that information encoded in the RX signals can be extracted (the digital block 220 may also be referred to as a "digital signal processing circuit"). In some embodiments, the digital block 220 may be what is known in the art as "PHY," which commonly refers to circuitry used to perform physical layer functions. In some embodiments of implementing per-carrier and/or per-antenna digital beamforming as described herein, the digital block 220 may be configured to perform some adjustments of phase and/or amplitude of some TX or RX signals (i.e., phase/amplitude shifting may be partially performed by the digital block 220). These embodiments will be described in greater detail below.

As shown in FIG. 2, the digital block 220 may support a plurality of channels and include a plurality of input/output (I/O) ports, labeled in FIG. 2 as I/O1, I/O2, and so on, until I/O N (N may be an integer greater than 1), with a given I/O port of the digital block 220 corresponding to a certain channel (the channels labeled in FIG. 2 as CH1, CH2, and so on, until CH N). Different channels of the digital block 220 may be coupled to different transceivers of the transceiver array 230 and different antenna elements of the antenna array 250.

Figure 3:
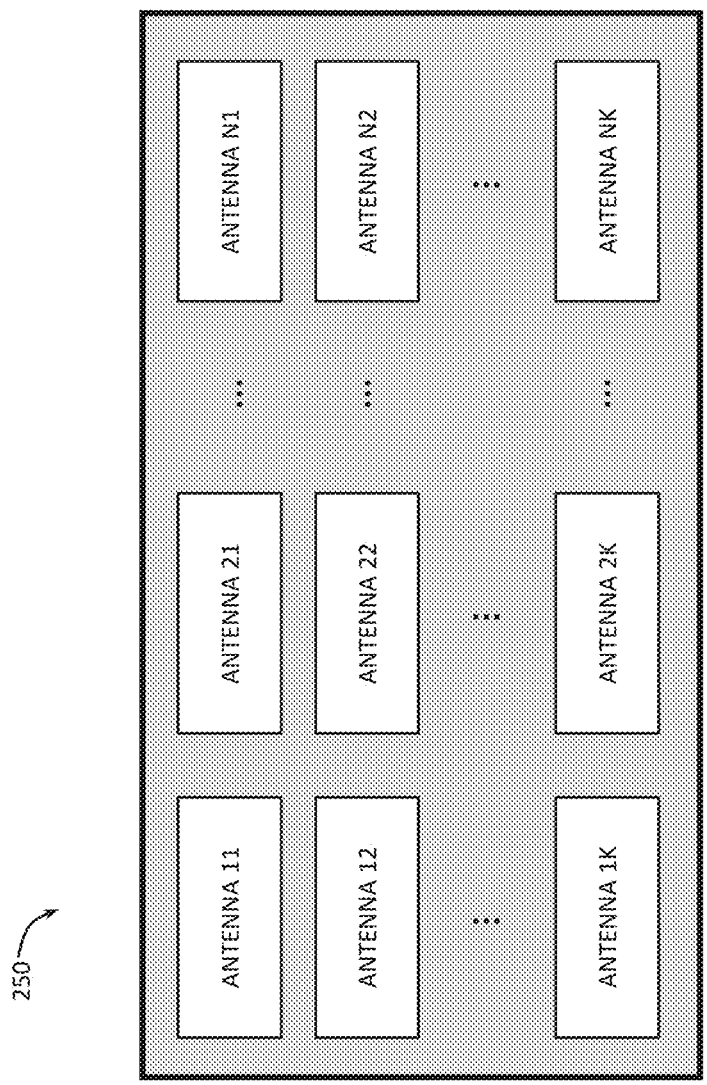
FIG. 3 provides a block diagram illustrating an example antenna array that may be used in the RF system shown in FIG. 2, according to some embodiments of the present disclosure.

In some embodiments, the antenna array 250 may include a plurality of antenna elements arranged in rows and columns. An example of such an arrangement is shown in FIG. 3, illustrating that the antenna array 250 may include N*K antenna elements (labeled in FIG. 3 as antenna 11, antenna 12, antenna 13, etc.) arranged in N columns and K rows, where K may be any integer greater than 1. In the embodiment shown in FIGS. 2 and 3, the variable N shown with reference to the antenna array 250 may be the same N as refers to the number of channels supported by the digital block 220. To that end, the antenna elements of the antenna array 250 may be broken up in what may be referred to as an "antenna cell" (labeled in FIG. 2 as an antenna cell 260-1, an antenna cell 260-2, and so on, until an antenna cell 260-N), where each antenna cell 260 may include a plurality of antenna elements of a different column, and different antenna cells may be coupled to different I/O ports of the digital block 220. Thus, as shown in FIG. 2, in some embodiments, the antenna cell 260-1 may include antenna elements 11 through 1K of the first row of the antenna array 250, which antenna cell 260-1 may be coupled to the I/O 1 of the digital block 220; the antenna cell 260-2 may include antenna elements 21 through 2K of the second row of the antenna array 250, which antenna cell 260-2 may be coupled to the I/O 2 of the digital block 220, and so on. In other embodiments, the antenna array 250 may include more or less than N columns of the antenna elements.

In general, each antenna element of the antenna array 250 may include any suitable antenna element, or a plurality of antenna elements, configured to transmit and receive wireless RF signals in separate (e.g., non-overlapping and non-continuous) bands of frequencies, e.g., in bands having a separation of, for example, several megahertz from one another. In some embodiments, each of at least some of the antenna elements may be a single multi-band antenna. In some embodiments, each of at least some of the antenna elements may be a plurality of band-specific antennas (i.e., a plurality of antennas each configured to receive and transmit signals in a specific band of frequencies). In some embodiments, the antenna elements of the antenna array 250 may be configured to operate in a TDD mode. In other embodiments, the antenna elements of the antenna array 250 may be configured to operate in an FDD mode.

In some embodiments, for each antenna element of the antenna array 250, the RF transceiver system 200 may include a designated (i.e., different/respective) transceiver. This is shown in FIG. 2 with different transceivers of the transceiver array 230 being shown with the same 2-digit reference numerals as those used for the antenna elements of the antenna array 250 (where the first digit refers to the column number and the second digit refers to the row number of a given antenna element of the antenna array 250). When antenna elements of the antenna array 250 are separated into antenna cells 260, the transceivers if the transceiver array 230 may be similarly separated into transceiver cells 240, labeled in FIG. 2 as a transceiver cell 240-1, a transceiver cell 240-2, and so on, until a transceiver cell 240-N. Each transceiver cell 240 may be coupled to a different antenna cell 260 and be coupled to a different I/O port of the digital block 220. Thus, as shown in FIG. 2, in some embodiments, the transceiver cell 240-1 may include transceivers 11 through 1K of the transceiver array 230, which transceiver cell 240-1 may be coupled between the antenna cell 260-1 and the I/O 1 of the digital block 220; the transceiver cell 240-2 may include transceivers 21 through 2K of the transceiver array 230, which transceiver cell 240-2 may be coupled between the antenna cell 260-2 and the I/O 2 of the digital block 220, and so on.

In the embodiments when each channel of the digital block 220 is coupled to a different sequence of a transceiver cell 240 and an antenna cell 260 corresponding to a different column of the antenna elements of the antenna array 250, as shown in FIG. 2, the digital block 220 may be configured to perform phase shifting and amplitude adjustments with respect to one direction/plane of the main beam for different columns of the antenna elements of the antenna array 250. For example, different channels of the digital block 220 may be configured to implement different phase and amplitude adjustments for the horizontal plane of the beam. For example, with reference to the TX signals, the TX signals output by the digital block 220 on different I/O ports may differ in the amount of phase and amplitude adjustments for the horizontal plane of the beam. The phase and amplitude adjustments for the vertical plane of the beam may then be implemented in the individual transceivers of the transceiver cells coupled to the different I/O ports of the digital block 220.

The division of the antenna elements into antenna cells 260 and of the transceivers into transceiver cells 240 is mainly functional and, in other embodiments, variations to that division are possible. For example, rows and columns as described herein may be interchanged. Having an individual transceiver corresponding/coupled to a given antenna element of the antenna array 250 advantageously allows performing channel-specific beamforming, power amplifier (PA)-specific DPD, and other functions carefully tailored to a given antenna element or a given antenna cell 260. However, in other embodiments, there may be a transceiver of the transceiver array 230 shared among two or more antenna elements of the antenna array 250 (i.e., there may be less transceivers in the transceiver array 230 than antenna elements in the antenna array 250). In some embodiments, some or all antenna elements of the antenna array 250 may be implemented on a single die, substrate, wafer, or chip. In some embodiments, some or all transceivers of the transceiver array 230 may be implemented on a single die, substrate, wafer, or chip.

Figure 4:
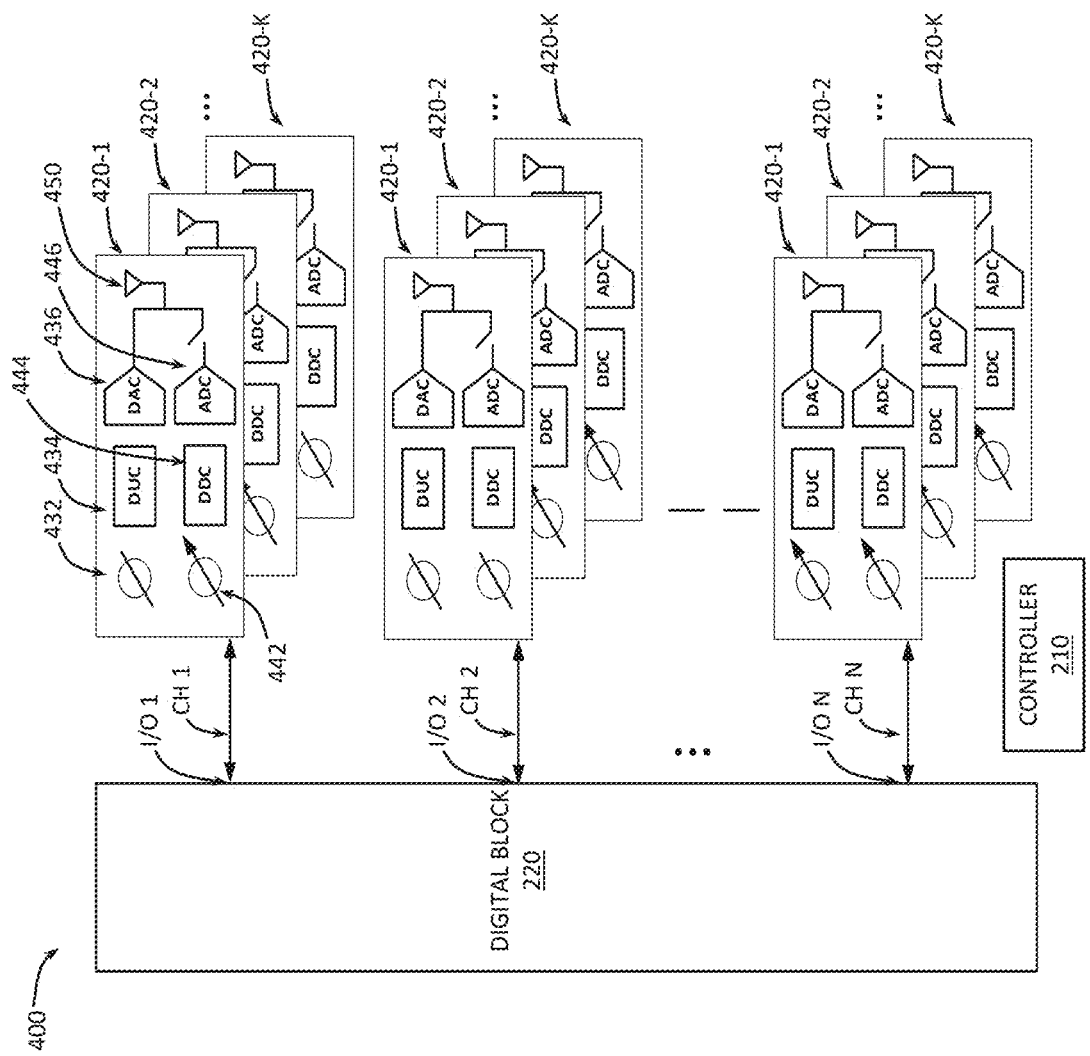
FIG. 4 provides a block diagram illustrating an example RF system configured to implement per-antenna digital beamforming for cellular wireless communications, according to some embodiments of the present disclosure.

Further details of the transceivers of the transceiver array 230 are shown in FIG. 4, providing a block diagram illustrating an example RF system 400 configured to implement per-antenna digital beamforming for cellular wireless communications, according to some embodiments of the present disclosure. The RF system 400 is an example of the RF transceiver system 200 and, therefore, some elements shown in FIG. 4 are labeled with the same reference numerals and letters as those shown in FIG. 2 so that descriptions of similar or analogous components provided for one of the drawings do not have to be repeated for the other. The RF system 400 illustrates the digital block 220, with the I/O ports 1-N and channels CH 1-N, as was shown in FIG. 2. For each of the channels, FIG. 4 further illustrates blocks 420-1, 420-2, and so on, until 420-K. Each block 420 is a combination of a transceiver and a corresponding antenna element of the transceiver array 230 and the antenna array 250 shown in FIG. 2. For example, the block 420-1 illustrates an antenna element 450, representing the antenna element antenna 11 shown in FIG. 2, and further illustrates some components of the transceiver 11 of FIG. 2. In particular, FIG. 4 illustrates that the transceiver 11 may include a TX path that includes a digital TX adjuster 432, a digital upconverter (DUC) 434, and a digital-to-analog converter (DAC) 436. FIG. 4 further illustrates that the transceiver 11 may include a RX path that includes a digital RX adjuster 442, a digital downconverter (DDC) 444, and an ADC 446. In some embodiments, the antenna element 450 may be used either with the TX path or with the RX path of the transceiver 11, as is shown in FIG. 4 with a switch between the TX path and the antenna element 450 being closed and a switch between the RX path and the antenna element 450 being open (e.g., when the antenna 450 is configured to operate in a TDD mode). Individual components of other blocks 420 shown in FIG. 4 are not individually labeled in order to not clutter the drawing, but each of the other blocks 420 may be implemented as the block for the transceiver 11 and the antenna element 11 of the block 420-11.

Turning to the details of the TX path of the representative block 420-1, the digital TX adjuster 432 may be configured to receive an input signal indicative of a signal transmitted by the digital block 220 from the I/O 1 over the channel CH 1, which signal is indicative of a TX signal to be transmitted by the antenna element 450 of the block 420-1. The digital TX adjuster 432 may be configured to generate an output signal by adjusting/modifying one or more of a phase and an amplitude of its input signal. Both the input and the output signals of the digital TX adjuster 432 may be baseband signals. The DUC 434 is configured to perform an upconversion of a signal indicative of the output of the digital TX adjuster 432 to generate a corresponding signal but at a higher frequency, e.g., upconverted to an intermediate frequency (IF). Conversion to an IF may be useful for several reasons. For example, when several stages of filters are used, they can all be set to a fixed frequency, which makes them easier to build and to tune. In some embodiments, the DUC 434 may be just one of several stages of upconversion that may be implemented in the transceiver 11, with the other stages not shown in FIG. 4 in order to not clutter the drawing. Thus, in general, the DUC 434 may be configured to shift a signal indicative of the output of the digital TX adjuster 432 to a signal of a higher frequency, where the former may but does not have to be a baseband signal, and the latter is a signal shifted to a higher frequency. Furthermore, although not specifically shown in FIG. 4, the DUC 434 may be a quadrature upconverter, in which case it would include a first DUC and a second DUC, configured to provide upconverted signals for the in-phase (I) and quadrature (Q) paths, respectively (as is known in the art, signals provided over I and Q paths signals having a 90 degrees offset with respect to one another). A signal indicative of the output of the DUC 434 may then be converted to an analog signal by the DAC 436. Although no other components are shown in FIG. 4 between the DAC 436 and the antenna element 450, typically the TX path would include other components in the path of the analog domain TX signal, such as an analog filter, a further upconverter configured to perform an upconversion to the RF frequency, and a power amplifier, configured to amplify the TX signal before providing the TX signal to the antenna element 450. Furthermore, additional components may be present between the DUC 434 and the DAC 436, such as a DPD module, a crest-factor reduction (CFR) module, etc.

Turning to the details of the RX path of the representative block 420-1, an analog signal indicative of the output of the antenna element 450 (i.e., a signal indicative of the signal received by the antenna element 450) may then be converted to a digital signal by the ADC 446. Although no other components are shown in FIG. 4 between the antenna element 450 and the ADC 436, typically the RX path would include other components in the path of the analog domain RX signal, such as a low-noise amplifier (LNA), a downconverter configured to perform a downconversion from the RF frequency to a lower frequency (e.g., to the IF frequency), an analog filter, etc. The DDC 444 is configured to perform a downconversion of a signal indicative of the output of the ADC 446 to generate a corresponding RX signal but at a lower frequency, e.g., downconverted from the IF to baseband. In some embodiments, the DDC 444 may be just one of several stages of downconversion that may be implemented in the transceiver 11, with the other stages not shown in FIG. 4 in order to not clutter the drawing. Thus, in general, the DDC 434 may be configured to shift an RX signal to a signal of a lower frequency, where the latter may but does not have to be a baseband signal, and the former is a signal of a higher frequency. Furthermore, although not specifically shown in FIG. 4, the DDC 444 may be a quadrature downconverter, in which case it would include a first DDC and a second DDC, configured to provide downconverted signals for the I and Q paths, respectively. Furthermore, additional components may be present between the ADC 446 and the DDC 444 (not shown in FIG. 4). The digital RX adjuster 442 may be configured to receive an input signal indicative of an output of the DDC 444 and generate an output signal by adjusting/modifying one or more of a phase and an amplitude of its input signal. Both the input and the output signals of the digital RX adjuster 442 may be baseband signals. A signal indicative of the output of the digital RX adjuster 442 may then be provided to the digital block 220, via the I/O 1, over the channel CH 1, which signal is indicative of an RX signal received by the antenna element 450 of the block 420-1.

In general, the frequency of each DUC/DDC pair of the RF system 400 (i.e., the frequency to which the DUC 434 performs the upconversion to and the frequency from which the DDC 444 performs the downconversion) may be arbitrary (e.g., may be programmable, e.g., user-defined). For example, different transceivers of the transceiver array 230 coupled to a given channel (e.g., the transceivers 11-1K coupled to the channel CH 1) could include respective DUC/DDC pairs of different frequencies. In another example, at least some of the transceivers of the transceiver array 230 coupled to two or more different channels could include DUC/DDC pairs of the same frequency but steer the beams in different directions (by virtue of gain/amplitude adjustment using the digital TX adjuster 432 and/or the digital RX adjuster 442), allowing spatial frequency re-use. The ability to individually control/set the frequencies of different DUC/DDC pairs may advantageously allow increasing network capacity, which is very valuable. The controller 210 may be configured to control frequencies of the different DUC/DDC pairs of the individual transceivers of the RF system 400.

The architecture illustrated in FIG. 4 may allow performing digital beamforming on a per-antenna basis because different antenna elements 450 have corresponding different TX and RX paths that can perform processing of the TX and RX signals, respectively, for those antenna elements 450. In other words, in the RF system 400 there may be a one-to-one correspondence between the number of antenna elements 450 and the number of the TX paths in all of the transceivers of the transceiver array 230, and a one-to-one correspondence between the number of antenna elements 450 and the number of the RX paths in all of the transceivers of the transceiver array 230. In some embodiments, the digital beamforming may then be performed as follows (described with respect to the TX path, and the beamforming for the RX path could be corresponding, e.g., reciprocal). In some embodiments, the TX signals provided by the digital block 220 over different channels CH 1 through CH N could be different in that the digital block 220 performed respective phase/amplitude adjustments in the horizontal plane of the beam for the TX signals of the different channels. Individual digital TX adjusters 432 in different transceivers of the transceiver array 230 may then be configured to implement respective phase/amplitude adjustments in the vertical plane of the beam for the TX signals to be transmitted by different antennas of the antenna array 250, thus realizing a per-antenna digital beamforming. As is shown in FIG. 4, a set of blocks 420-1 through 420-K coupled to a given channel may receive the same input signal (and sets of blocks 420-1 through 420-K coupled to different channels may receive different input signals), but then implement different phase/amplitude adjustments for the respective antenna 450 included within different ones of the blocks 420.

Figure 5:
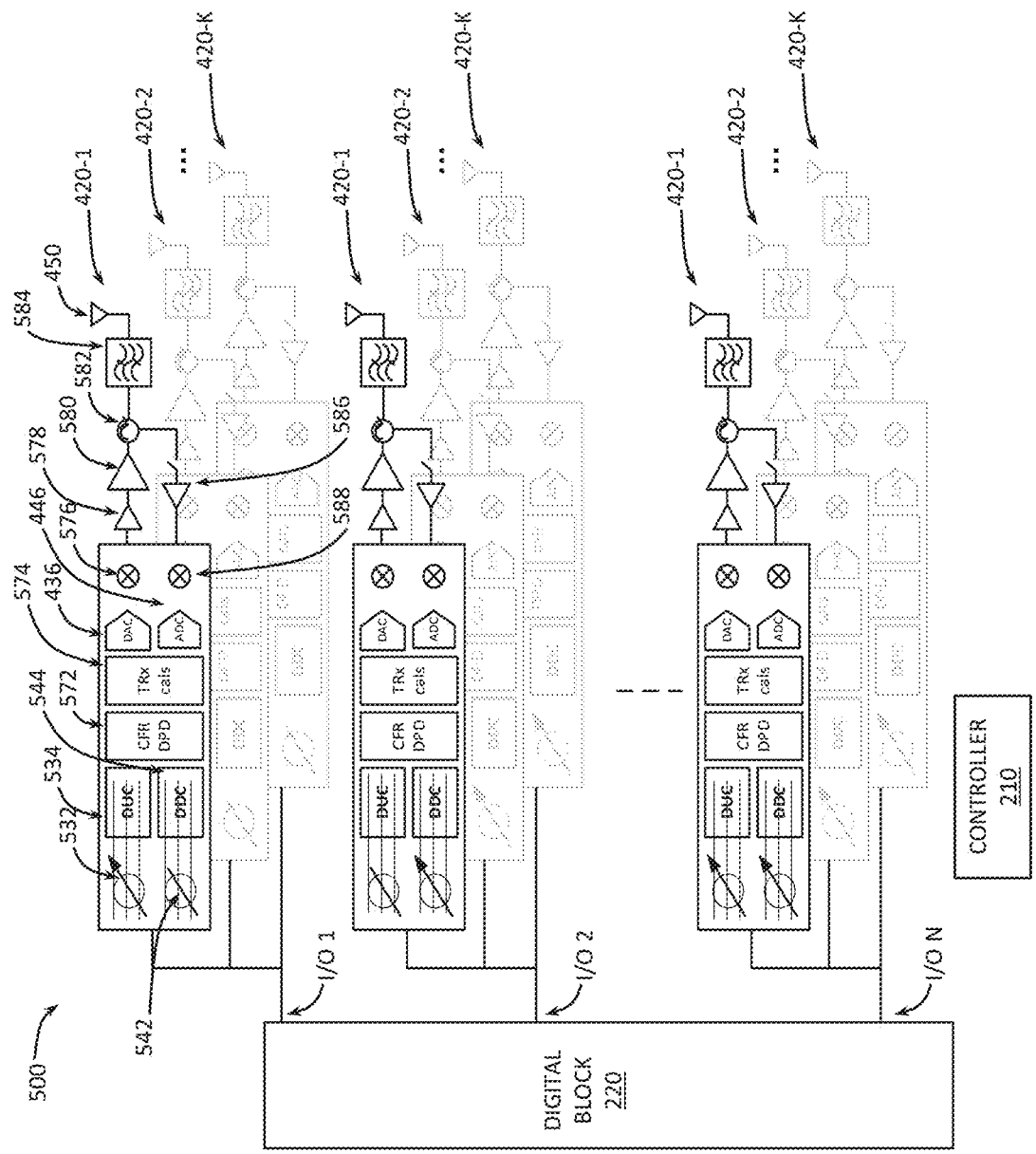
FIG. 5 provides a block diagram illustrating an example RF system configured to implement per-carrier digital beamforming, e.g., on a per-antenna basis, for cellular wireless communications, according to some embodiments of the present disclosure.

In some embodiments, digital beamforming may be implemented not only on a per-antenna basis but also on a per-carrier basis. An example of such an implementation is shown in FIG. 5, providing a block diagram illustrating an example RF system 500 configured to implement per-carrier digital beamforming, e.g., on a per-carrier and per-antenna basis, for cellular wireless communications, according to some embodiments of the present disclosure. The RF system 500 is an example of the RF system 400 and, therefore, some elements shown in FIG. 5 are labeled with the same reference numerals and letters as those shown in FIG. 4 so that descriptions of similar or analogous components provided for one of the drawings do not have to be repeated for the other. For each of the blocks 420, FIG. 5 illustrates a digital TX adjuster 532, a DUC 534, a digital RX adjuster 542, and a DDC 544. Furthermore, for each of the blocks 420, FIG. 5 further illustrates a CFR and/or DPD module 572, a TRx calibration module 574, an analog upconverting mixer 576, a pre-amplifier 578, a power amplifier 580, a circulator 582, an analog filter 584, an LNA 586, and an analog downconverting mixer 588.

The digital TX adjuster 532 is similar to the digital TX adjuster 432 except that now it is configured to perform phase/amplitude adjustments on a per-carrier basis. The DUC 534 is similar to the DUC 434 except that now it is configured to perform digital upconversion on a per-carrier basis. The digital RX adjuster 542 is similar to the digital RX adjuster 442 except that now it is configured to perform phase/amplitude adjustments on a per-carrier basis. The DDC 544 is similar to the DDC 444 except that now it is configured to perform digital downconversion on a per-carrier basis. To highlight that the digital TX adjuster 532, the DUC 534, the digital RX adjuster 542, and the DDC 544 operate on a per-carrier basis, FIG. 5 illustrates multiple horizontal lines going through these components. As used herein, describing something as operating on a per-carrier basis refers to the ability to perform a certain functionality differently for different carrier signals. Thus, per-carrier beamforming means that the digital TX adjuster 532 and the digital RX adjuster 542 are configured to perform phase/amplitude adjustments differently for different carriers. Per-carrier beamforming using the digital TX adjuster 532, the DUC 534, the digital RX adjuster 542, and the DDC 544 is described in greater detail with reference to FIG. 6.

The other components shown in FIG. 5 which were not shown in FIG. 4 are only illustrated as an example of how the RF system 500 may be implemented, but any of those components may be implemented as known in the art. For example, the CFR and/or DPD module 572 may be configured to implement any CFR and/or DPD algorithms to modify the TX signals to be transmitted by the antenna element 450 to compensate for various nonlinear phenomena that may negatively affect the TX signals. The TRx calibration module 574 may be configured to perform transceiver calibration such as DC offset removal, local oscillator leakage cancellation, and quadrature error correction. The analog upconverting mixer 576 may be configured to perform analog upconversion of a signal indicative of the output of the DAC 436, e.g., using a local oscillator (LO) signal (the LO not specifically shown in FIG. 5). In some embodiments, the DAC 436 may be configured to perform the upconversion performed by the analog upconverting mixer 576 (i.e., a separate analog upconverting mixer 576 as shown in FIG. 5 may be omitted). The pre-amplifier 578 may be configured to perform the first stage and the PA 580 is configured to perform the second stage of power amplification (in other embodiments, the power amplification may be performed in a single stage, or in more than 2 stages). The circulator 582 may be configured to separate TX and RX signals when the RF system operates in a TDD mode. The analog filter 584 is configured to perform the analog domain filtering of the TX signals to be transmitted by the antenna element 450 and/or of the RX signal received by the antenna element 450. The LNA 586 is configured to amplify the RX signals in the analog domain. The analog downconverting mixer 588 may be configured to perform analog downconversion of the RX signal, e.g., using the LO signal. In some embodiments, the ADC 446 may be configured to perform the downconversion performed by the analog downconverting mixer 588 (i.e., a separate analog downconverting mixer 588 as shown in FIG. 5 may be omitted).

Figure 6:
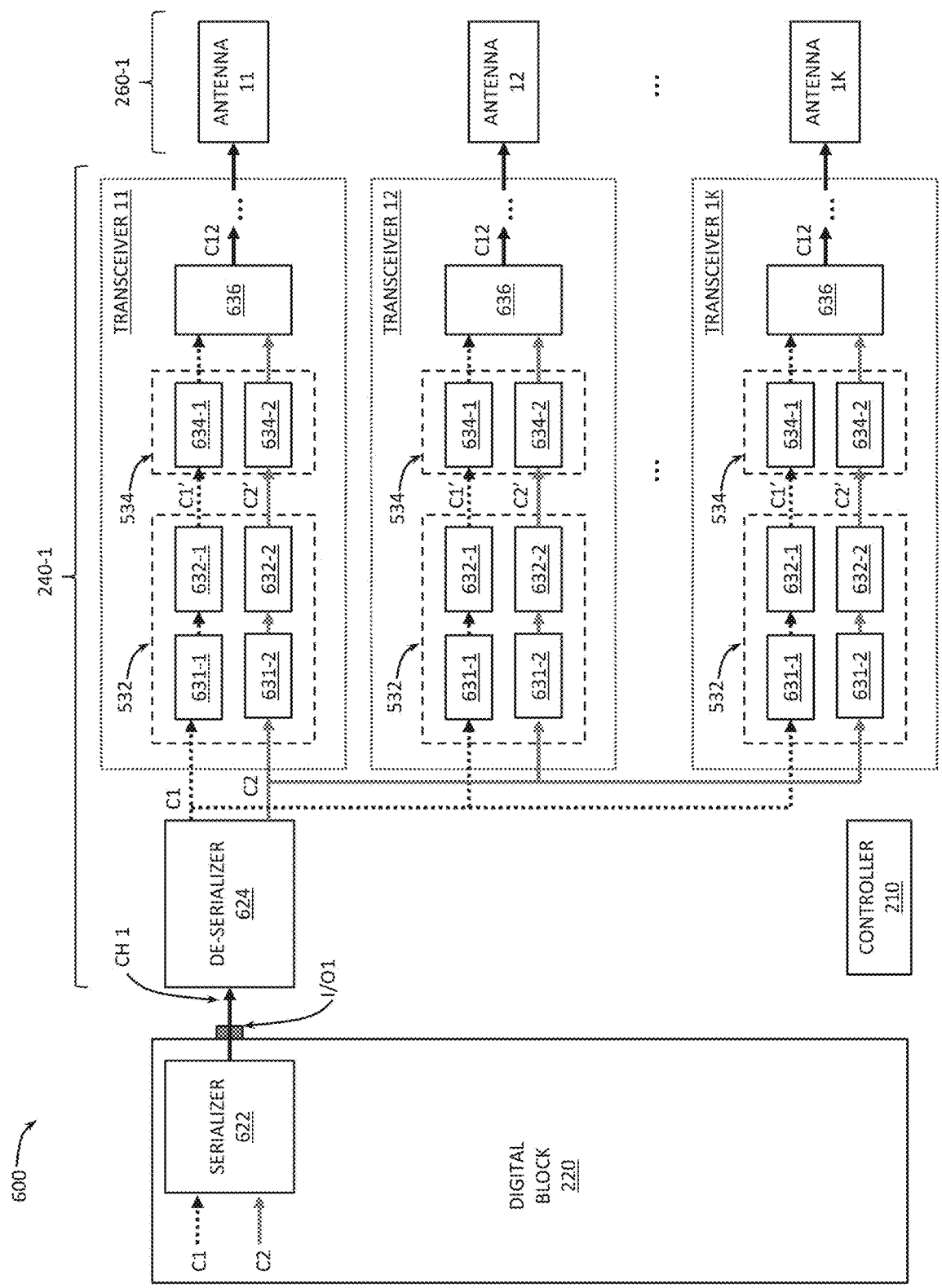
FIG. 6 provides a block diagram illustrating per-carrier beamforming in a transmit path of a K-channel transceiver cell of an RF system, according to some embodiments of the present disclosure.

Per-carrier digital beamforming may be described in greater detail with reference to FIG. 6, providing a block diagram illustrating per-carrier beamforming in a TX path of a K-channel transceiver cell of an RF system 600, according to some embodiments of the present disclosure. The RF system 600 is an example of the RF system 500 and, therefore, some elements shown in FIG. 6 are labeled with the same reference numerals and letters as those shown in FIG. 5 so that descriptions of similar or analogous components provided for one of the drawings do not have to be repeated for the other. In particular, FIG. 6 illustrates only the components associated with one of the channels of the digital block 220 of the RF system 500, e.g., channel CH 1. Thus, FIG. 6 illustrates the details of the transceivers 11-1K of the transceiver cell 240-1, coupled to, respectively, antenna elements 11-1K of the antenna cell 260-1. These descriptions are equally applicable to other channels of the digital block 220. While the descriptions of FIG. 6 are provided for the TX path, these descriptions are equally applicable to the RX path with modifications that would be apparent to a person of ordinary skill in the art because of the reciprocal nature of the TX and RX paths, all of which embodiments being within the scope of the present disclosure.

Each channel of the digital block 220 may be configured to support multiple carriers, e.g., carriers C1 and C2. Although FIG. 6 illustrates only 2 carriers, in other embodiments, these descriptions may easily be extended to cover any number of 2 or more carriers, all of which embodiments being within the scope of the present disclosure. The carriers C1 and C2 may be of any frequency and bandwidth, depending on the wireless technology of the RF system 600. For example, in LTE systems, the carrier bandwidth varies between 1.4 MHz and 20 MHz, while in 5G new radio (NR) systems, the widest sub-6 GHz (FR1) carrier bandwidth may be as large as 100 MHz. The digital block 220 may be configured to prepare signals C1 and C2 for transmission and provide those signals, via the I/O 1 and via channel CH 1 to each of the transceivers of the transceiver cell 240-1.

In some embodiments, the C1 and C2 digital signals may be provided from the digital block 220 to the transceiver cell 240-1 over a serial interface. To that end, as shown in FIG. 6, the digital block 220 may include a serializer 622 configured to serialize the signals C1 and C2 provided thereto in parallel, to generate a signal that includes C1 and C2, which signal may then be provided over a serial interface of CH1 to the transceiver cell 240-1. The transceiver cell 240-1 may include a de-serializer 624, configured to reconstruct the individual signals C1 and C2 and provide each of the signals C1 and C2 to each of the transceivers 11-1K. Such embodiments may be advantageous in terms of a reduced chip-to-chip interface bandwidth requirements, e.g., when the digital block 220 is implemented on one chip, and the transceiver cell 240-1 is implemented on another chip. However, in other embodiments, the interface of CH 1 does not have to be serial, and the different carrier signals may be provided from the digital block 220 to the transceiver cell 240-1 in parallel.

Whether provided over a serial or a parallel interface of CH1, within the transceiver cell 240-1, each of the carrier signals C1 and C2 is provided to each of the transceivers 11-1K. In particular, the digital TX adjusters 532 of different ones of the transceivers 11-1K may be configured to receive the carrier signals C1 and C2 (or signal indicative thereof). The digital TX adjuster 532 of a given transceiver may be configured to process the different carrier signals separately, e.g., in parallel. To that end, as shown in FIG. 6, the digital TX adjuster 532 may include a phase shifter 631-1 and a gain adjuster 632-1, configured to perform, respectively, phase and amplitude adjustments of the TX signal for the first carrier C1. As further shown in FIG. 6, the digital TX adjuster 532 may also include a phase shifter 631-2 and a gain adjuster 632-2, configured to perform, respectively, phase and amplitude adjustments of the TX signal for the second carrier C2. While FIG. 6 illustrates that the TX signal for each carrier is first provided to the phase shifter 631 and then to the gain adjuster 632, in other embodiments, this order may be reversed for some or all carriers processed by some or all transceivers. Together, the phase shifter 631-1 and the gain adjuster 632-1 may be seen as a first digital adjuster (of the digital TX adjuster 532), configured to generate a first adjuster output signal by modifying one or more of a phase and an amplitude of the first adjuster input signal (i.e., the input signal indicative of the TX signal C1). Similarly, together, the phase shifter 631-2 and the gain adjuster 632-2 may be seen as a second digital adjuster (of the digital TX adjuster 532), configured to generate a second adjuster output signal by modifying one or more of a phase and an amplitude of the second adjuster input signal (i.e., the input signal indicative of the TX signal C2).

In some embodiments, the input and the output signals from the first and second digital adjusters are baseband signals. Thus, signals C1 and C2 provided to each of the transceivers 11-1K may be baseband signals, indicative of TX signals in first and second RF frequency bands to which they will be upconverter later on, while signals C1' and C2' output by each of the transceivers 11-1K may still be baseband signals, but with phase/amplitude adjustment in accordance with the desired beamforming. The input signal C1 provided to each of the transceivers of a given transceiver cell (e.g., to the transceivers 11-1K of the transceiver cell 240-1) may be the same input signal, but the output signal C1 generated by the digital TX adjusters 532 of different transceivers (in particular, generated by the phase shifter 631-1 and the gain adjuster 632-1 of different transceivers) may be different because of different phase/amplitude adjustments applied to the input signal C1 within the digital TX adjusters 532 of different transceivers. Similarly, the input signal C2 provided to each of the transceivers of a given transceiver cell (e.g., to the transceivers 11-1K of the transceiver cell 240-1) may be the same input signal, but the output signal C2 generated by the digital TX adjusters 532 of different transceivers (in particular, generated by the phase shifter 631-2 and the gain adjuster 632-2 of different transceivers) may be different because of different phase/amplitude adjustments applied to the input signal C2 within the digital TX adjusters 532 of different transceivers.

As further shown in FIG. 6, the phase/amplitude adjusted signals C1' and C2' are then provided to respective DUCs, e.g., to a DUC 634-1 and a DUC 634-2, respectively. Together, the DUC 634-1 and the DUC 634-2 may be seen as the DUC 534, described above. In particular, each of the DUCs 634-1 and DUC 634-2 may be configured to perform the upconversion as was described above with reference to the DUC 534, except that the DUCs 634-1 and DUC 634-2 are configured to receive baseband TX signals for different carriers. The DUCs 634-1 and 634-2 may be configured to apply frequency shifts to the baseband signals C1' and C2', respectively. For example, in some embodiments, the DUC 634-1 may shift the signal C1' negatively in frequency, while the DUC 634-2 may shift the signal C2' positively in frequency (or the other way around). At this point, the composite signal of the frequency-shifted C1' and C2' is still in a digital I/O format of quadrature processing.

As also shown in FIG. 6, each of the transceivers may further include a combiner 636, configured to combine the outputs of the multiple DUCs 634 of that transceiver (e.g., the output of the DUC 634-1 and the DUC 634-2) to generate a composite signal C12. The composite signal C12 may be a baseband signal centered at 0 the DC, with TX signals of various carriers arranged in a way that corresponds to their relative arrangement in the RF. Said differently, the DUCs 634 of a given transceiver of the transceiver cell 240-1 may be configured to upconvert and frequency shift the signals C1' and C2' so that, when arranged in a composite signal (e.g., the signal C12 generated by the combiner 636), the arrangement of the signals C1' and C2' along an axis measuring frequency is such that the composite signal C12 is still within the transceiver's baseband bandwidth (e.g., C1' and C2' of the composite signal C12 may be centered at DC, but in other embodiments they do not have to be centered at DC as long as they are somewhere within the transceiver's baseband bandwidth) and the relative arrangement of the signals C1' and C2' corresponds to the relative arrangement of the signals C1' and C2' when they are converted to RF.

The composite signals C12 may then proceed through the signal chain of their respective transceivers (i.e., the signal chain of the transceivers after the DUC 534) until they are converted to analog RF signals centered at Fc and transmitted by the respective antenna elements associated with the transceivers. As described above, in various embodiments, said conversion may be done in a variety of ways including direct synthesis with an RF DAC (e.g., the DAC 436), conversion to analog via a pair of quadrature baseband DACs followed by upconversion to RF via quadrature mixers or in two or more steps by converting to an IF frequency in the DAC followed by conversion to Fc by a mixer (e.g., the mixer 576).

In FIG. 6, when TX signals are separate for carriers C1 and C2, those for the carrier C1 are shown with black dotted arrows, while those for the carrier for C2 are shown with gray arrows (i.e., arrows going to the serializer 622, arrows going to and from the phase shifters 631, arrows going to and from the gain adjusters 632, and arrows going to and from the phase shifters 631, arrows going to and from the DUCs 634).

To summarize, together, each of the K channels of a given transceiver cell 240 (where the K channels may include the transceiver portions of the block 420-1 through 420-K, shown in FIGS. 4 and 5), is configured to realize desired phase shift and gain adjustment. Taken together, the K phase and gain adjustments form a beam at RF. Within each of the K channels of a given transceiver cell 240, each carrier may have a dedicated phase and amplitude adjustments, with 2 carriers shown in the illustration of FIG. 6 but the number of carriers may be arbitrary. In some embodiments, the phase and gain adjustment weights may be stored in a loop-up table associated with the transceiver array 230 or may be provided to the transceiver array 230.

Example Data Processing System

Figure 7:
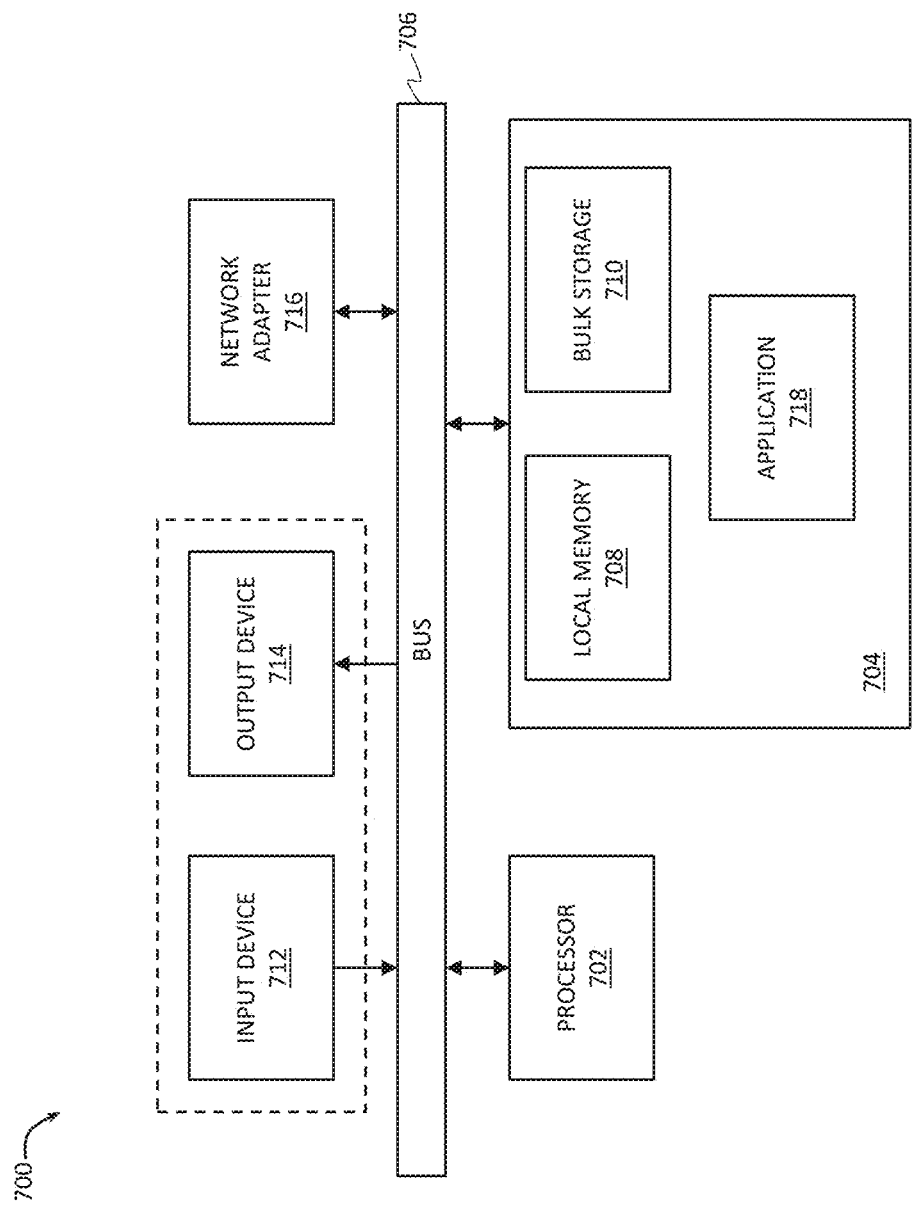
FIG. 7 provides a block diagram illustrating an example data processing system that may be configured to implement, or control implementation of, at least portions of digital beamforming as described herein, according to some embodiments of the present disclosure.

FIG. 7 provides a block diagram illustrating an example data processing system 700 that may be configured to implement, or control implementation of, at least portions of the per-carrier and/or per-antenna digital beamforming for cellular wireless communications as described herein, according to some embodiments of the present disclosure. For example, the controller 210 may include at least portions of the data processing system 700.

As shown in FIG. 7, the data processing system 700 may include at least one processor 702, e.g., a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure.

In some embodiments, the processor 702 can execute software or an algorithm to perform the activities as discussed in the present disclosure, in particular activities related to per-carrier and/or per-antenna digital beamforming for cellular wireless RF systems as described herein. The processor 702 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., the transceivers of the transceiver array 230 (or any individual components of these transceivers), antennas of the antenna array 250, or other elements/components shown in FIGS. 2-6, can also include suitable interfaces for receiving, transmitting, and/or otherwise communicating data or information in a network environment so that they can communicate with, e.g., the data processing system 700.

In certain example implementations, mechanisms for per-carrier and/or per-antenna digital beamforming for cellular wireless communications as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or light emitting diodes (LEDs). In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

Select Examples

The following paragraphs provide various examples of the embodiments disclosed herein.

Example 1 provides a digital beamforming device for a cellular RF antenna apparatus. The device includes a first digital adjuster and a second digital adjuster. The first digital adjuster (e.g., 631-1 and 632-1 of the transceiver 11 shown in FIG. 6) is configured to receive a first adjuster input signal indicative of a transmit (TX) signal in a first frequency band (C1), and to generate a first adjuster output signal (Cr) by modifying one or more of a phase and an amplitude of the first adjuster input signal, where each of the first adjuster input signal and the first adjuster output signal is a digital signal. The second digital adjuster (e.g., 631-2 and 632-2 of the transceiver 11 shown in FIG. 6) is configured to receive a second adjuster input signal indicative of a TX signal in a second frequency band (C2), where the second frequency band is different from the first frequency band, and to generate a second adjuster output signal (C2') by modifying one or more of a phase and an amplitude of the second adjuster input signal, where each of the second adjuster input signal and the second adjuster output signal is a digital signal. The device further includes a combiner (e.g., 636 of the transceiver 11 shown in FIG. 6), configured to combine a signal indicative of the first adjuster output and a signal indicative of the second adjuster output into a composite TX signal (e.g., C12 in the transceiver 11 shown in FIG. 6), where an RF signal based on the composite TX signal is to be wirelessly transmitted by an antenna element (e.g., antenna 11 shown in FIG. 6).

Example 2 provides the device according to example 1, further including a de-serializer, including at least an input port and a first and a second output ports. The de-serializer is configured to receive, at the input port of the de-serializer, a composite input signal, the composite input signal including one or more signal components indicative of the first adjuster input signal and further including one or more signal components indicative of the second adjuster input signal. The de-serializer is further configured to output at the first output port a signal indicative of the first adjuster input signal and output at the second output port a signal indicative of the second adjuster input signal.

Example 3 provides the device according to examples 1 or 2, where the device is configured to receive the first adjuster input signal and the second adjuster input signal from a digital block, via a digital interface.

Example 4 provides the device according to any one of the preceding examples, where the combiner is a first combiner, the composite TX signal is a first composite TX signal, and the antenna element is a first antenna element. The device further includes a third digital adjuster and a fourth digital adjuster. The third digital adjuster (e.g., 631-1 and 632-1 of the transceiver 12 shown in FIG. 6) is configured to receive the first adjuster input signal (i.e., the same input signal as that received by the first digital adjuster), and to generate a third adjuster output signal by modifying one or more of the phase and the amplitude of the first adjuster input signal, where the third adjuster output signal is a digital signal and where the third adjuster output signal is different from the first adjuster output signal (i.e., the first and third digital adjusters are configured to perform different phase/amplitude adjustment). The fourth digital adjuster (e.g., 631-2 and 632-2 of the transceiver 12 shown in FIG. 6) is configured to receive the second adjuster input signal (i.e., the same input signal as that received by the second digital adjuster), and to generate a fourth adjuster output signal by modifying one or more of the phase and the amplitude of the second adjuster input signal, where the fourth adjuster output signal is a digital signal and where the fourth adjuster output signal is different from the second adjuster output signal (i.e., the second and fourth digital adjusters are configured to perform different phase/amplitude adjustment). The device further includes a second combiner (e.g., 636 of the transceiver 12 shown in FIG. 6), configured to combine a signal indicative of the third adjuster output and a signal indicative of the fourth adjuster output into a second composite TX signal (e.g., C12 in the transceiver 12 shown in FIG. 6), where an RF signal based on the second composite TX signal is to be wirelessly transmitted by a second antenna element (e.g., antenna 12 shown in FIG. 6).

Example 5 provides the device according to example 4, where a phase and an amplitude of the first adjuster output signal are indicative of beamforming for the TX signal in the first frequency band to be transmitted by the first antenna element, a phase and an amplitude of the second adjuster output signal are indicative of beamforming for the TX signal in the second frequency band to be transmitted by the first antenna element, a phase and an amplitude of the third adjuster output signal are indicative of beamforming for the TX signal in the first frequency band to be transmitted by the second antenna element, and a phase and an amplitude of the fourth adjuster output signal are indicative of beamforming for the TX signal in the second frequency band to be transmitted by the second antenna element.

Example 6 provides the device according to example 5, where each of the beamforming for the TX signal in the first frequency band to be transmitted by the first antenna element, the beamforming for the TX signal in the second frequency band to be transmitted by the first antenna element, the beamforming for the TX signal in the first frequency band to be transmitted by the second antenna element, and the beamforming for the TX signal in the second frequency band to be transmitted by the second antenna element is beamforming along a first plane of a pair of a horizontal plane and a vertical plane for the TX signal.

Example 7 provides the device according to example 6, where the phase and the amplitude of the first adjuster input signal are indicative of beamforming along a second plane of the pair for the TX signal in the first frequency band to be transmitted either by the first antenna element or the second antenna element, and the phase and the amplitude of the second adjuster input signal are indicative of beamforming along the second plane for the TX signal in the second frequency band to be transmitted either by the first antenna element or the second antenna element.

Example 8 provides the device according to any one of the preceding examples, further including a first digital upconverter (DUC), configured to perform digital upconversion to covert the first adjuster output to a first upconverted adjuster output; and a second DUC, different from the first DUC, configured to perform digital upconversion to covert the second adjuster output to a second upconverted adjuster output, where the combiner is configured to combine a signal indicative of the first upconverted adjuster output and a signal indicative of the second upconverted adjuster output into the composite TX signal.

Example 9 provides the device according to example 8, where the composite TX signal is an intermediate frequency (IF) digital signal.

Example 10 provides the device according to any one of the preceding examples, where each of the first adjuster input signal, the first adjuster output signal, the second adjuster input signal, and the second adjuster output signal is a baseband signal.

Example 11 provides a digital beamforming device for a cellular RF antenna apparatus. The device includes a digital block, configured to apply a first modification to a transmit (TX) signal to generate a first TX signal, and to apply a second modification to the TX signal to generate a second TX signal, where applying each of the first modification and the second modification includes modifying one or more of a phase and an amplitude of the TX signal to reflect beamforming along a first plane of a pair of a horizontal plane and a vertical plane of a beam, and where the first modification is different from the second modification (different in one or more of a phase and an amplitude). The device further includes a first transceiver, configured to apply a first transceiver modification to the first TX signal by modifying one or more of a phase and an amplitude of the first TX signal to reflect beamforming along a second plane of the pair; and a second transceiver, configured to apply a second transceiver modification to the second TX signal by modifying one or more of a phase and an amplitude of the second TX signal to reflect beamforming along the second plane of the pair.

Example 12 provides the device according to example 11, where the first transceiver is one of a first plurality of transceivers of a first transceiver cell, where each transceiver of the first plurality of transceivers is configured to apply a respective/corresponding (i.e., different) first transceiver modification to the first TX signal by modifying one or more of the phase and the amplitude of the first TX signal to reflect beamforming along the second plane of the pair, and the second transceiver is one of a second plurality of transceivers of a second transceiver cell, where each transceiver of the second plurality of transceivers is configured to apply a respective/corresponding (i.e., different) second transceiver modification to the second TX signal by modifying one or more of the phase and the amplitude of the second TX signal to reflect beamforming along the second plane of the pair.

Example 13 provides the device according to example 12, where each transceiver of the first plurality of transceivers and the second plurality of transceivers is coupled to a respective/corresponding (i.e., different) antenna element. In this manner, digital beamforming may be performed on a per-antenna basis.

Example 14 provides the device according to examples 12 or 13, where each transceiver of the first plurality of transceivers and the second plurality of transceivers includes a digital upconverter (DUC) and a digital downconverter (DDC), and the device further includes a controller, configured to set frequencies of a pair of the DUC and the DDC for each transceiver of the first plurality of transceivers and the second plurality of transceivers on a per-transceiver basis.

Example 15 provides the device according to any one of examples 11-14, where the TX signal includes a first carrier component (C1) in a first frequency band and a second carrier component (C2) in a second frequency band, the second frequency band being different from the first frequency band, the first transceiver modification applied by the first transceiver to the first TX signal includes different modifications applied to the first and second carrier components of the first TX signal. In this manner, digital beamforming may be performed on a per-carrier basis.

Example 16 provides the device according to any one of examples 11-15, where each of the TX signal, the first TX signal, and the second TX signal is a digital baseband signal.

Example 17 provides an RF transceiver device. The device includes a first transceiver, configured to receive a first transmit (TX) signal, where the first TX signal is a TX signal to which a first modification has been applied; and a second transceiver, configured to receive a second TX signal, where the second TX signal is a TX signal to which a second modification has been applied. In such a device, each of the first modification and the second modification includes a modification of one or more of a phase and an amplitude of the TX signal to reflect beamforming along a first plane of a pair of a horizontal plane and a vertical plane of a beam, the first modification is different from the second modification (different in one or more of a phase and an amplitude), the first transceiver is configured to apply a first transceiver modification to the first TX signal by modifying one or more of a phase and an amplitude of the first TX signal to reflect beamforming along a second plane of the pair, and the second transceiver is configured to apply a second transceiver modification to the second TX signal by modifying one or more of a phase and an amplitude of the second TX signal to reflect beamforming along the second plane of the pair.

Example 18 provides the device according to example 17, where the first transceiver is one of a first plurality of transceivers of a first transceiver cell of the apparatus, where each transceiver of the first plurality of transceivers is configured to apply a respective/corresponding (i.e., different) first transceiver modification to the first TX signal by modifying one or more of the phase and the amplitude of the first TX signal to reflect beamforming along the second plane of the pair, and the second transceiver is one of a second plurality of transceivers of a second transceiver cell of the apparatus, where each transceiver of the second plurality of transceivers is configured to apply a respective/corresponding (i.e., different) second transceiver modification to the second TX signal by modifying one or more of the phase and the amplitude of the second TX signal to reflect beamforming along the second plane of the pair.

Example 19 provides the device according to example 18, where each transceiver of the first plurality of transceivers and the second plurality of transceivers is coupled to a respective/corresponding (i.e., different) antenna element. In this manner, digital beamforming may be performed on a per-antenna basis.

Example 20 provides the device according to any one of examples 17-19, where the TX signal includes a first carrier component (C1) in a first frequency band and a second carrier component (C2) in a second frequency band, the second frequency band being different from the first frequency band, the first transceiver modification applied by the first transceiver to the first TX signal includes different modifications applied to the first and second carrier components of the first TX signal. In this manner, digital beamforming may be performed on a per-carrier basis.

Variations and Implementations

While embodiments of the present disclosure were described above with references to exemplary implementations as shown in FIGS. 1-7, a person skilled in the art will realize that the various teachings described above are applicable to a large variety of other implementations.

In the discussions of the embodiments above, components of a system, such as e.g., phase adjusters, mixers, up/down converters, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to per-carrier and/or per-antenna digital beamforming for cellular wireless communications.

Parts of various systems for implementing per-carrier and/or per-antenna digital beamforming for cellular wireless communications as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the transceivers shown in FIGS. 2, 4, 5, and 6, and/or the number of the carrier signal bands shown in FIG. 6, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the present figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to per-carrier and/or per-antenna digital beamforming for cellular wireless communications as proposed herein illustrate only some of the possible functions that may be executed by, or within, system illustrated in the present figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The invention claimed is:

1. A radio frequency (RF) transceiver device, the device comprising:
   a first transceiver, to receive a first transmit (TX) signal, where the first TX signal is a TX signal to which a first modification has been applied, and where the first modification includes a modification of one or more of a phase and an amplitude of the TX signal to reflect beamforming along a first plane of a pair of a horizontal plane and a vertical plane of a beam,
   wherein the first transceiver is to apply a first transceiver modification to the first TX signal by modifying one or more of a phase and an amplitude of the first TX signal to reflect beamforming along a second plane of the pair.

2. The device according to claim 1, further comprising a second transceiver, to receive a second TX signal, where the second TX signal is a TX signal to which a second modification has been applied, wherein:
   the second modification includes a modification of one or more of the phase and the amplitude of the TX signal to reflect beamforming along the first plane of the pair,
   the second modification is different from the first modification, and
   the second transceiver is to apply a second transceiver modification to the second TX signal by modifying one or more of a phase and an amplitude of the second TX signal to reflect beamforming along the second plane of the pair.

3. The device according to claim 2, wherein the second transceiver is one of a second plurality of transceivers of a second transceiver cell of the apparatus, where each transceiver of the second plurality of transceivers is to apply a respective second transceiver modification to the second TX signal by modifying one or more of the phase and the amplitude of the second TX signal to reflect beamforming along the second plane of the pair.

4. The device according to claim 3, wherein each transceiver of the second plurality of transceivers is coupled to a respective antenna element.

5. The device according to claim 1, wherein the first transceiver is one of a first plurality of transceivers of a first transceiver cell of the apparatus, where each transceiver of the first plurality of transceivers is to apply a respective first transceiver modification to the first TX signal by modifying one or more of the phase and the amplitude of the first TX signal to reflect beamforming along the second plane of the pair.

6. The device according to claim 5, wherein each transceiver of the first plurality of transceivers is coupled to a respective antenna element.

7. The device according to claim 1, wherein:
the TX signal includes a first carrier component in a first frequency band and a second carrier component in a second frequency band, the second frequency band being different from the first frequency band, and
the first transceiver modification applied by the first transceiver to the first TX signal includes different modifications applied to the first and second carrier components of the first TX signal.

8. A beamforming device for a cellular radio frequency (RF) antenna apparatus, the device comprising:
a first adjuster, to receive a first adjuster input signal indicative of a transmit (TX) signal in a first frequency band, and to generate a first adjuster output signal by modifying one or more of a phase and an amplitude of the first adjuster input signal;
a second adjuster, to receive a second adjuster input signal indicative of a TX signal in a second frequency band, and to generate a second adjuster output signal by modifying one or more of a phase and an amplitude of the second adjuster input signal;
a third adjuster, to receive the first adjuster input signal, and to generate a third adjuster output signal by modifying one or more of the phase and the amplitude of the first adjuster input signal, where the third adjuster output signal is different from the first adjuster output signal;
a fourth adjuster, to receive the second adjuster input signal, and to generate a fourth adjuster output signal by modifying one or more of the phase and the amplitude of the second adjuster input signal, where the fourth adjuster output signal is different from the second adjuster output signal;
a first combiner, to combine a signal indicative of the first adjuster output and a signal indicative of the second adjuster output into a first composite TX signal; and
a second combiner, to combine a signal indicative of the third adjuster output and a signal indicative of the fourth adjuster output into a second composite TX signal.

9. The device according to claim 8, wherein each of the first adjuster input signal, the first adjuster output signal, the second adjuster input signal, and the second adjuster output signal is a digital signal.

10. The device according to claim 8, further comprising a de-serializer, comprising at least an input port and a first and a second output ports, to the de-serializer to:
receive, at the input port of the de-serializer, a composite input signal, the composite input signal comprising one or more signal components indicative of the first adjuster input signal and further comprising one or more signal components indicative of the second adjuster input signal,
output, at the first output port of the de-serializer, a signal indicative of the first adjuster input signal, and
output, at the second output port of the de-serializer, a signal indicative of the second adjuster input signal.

11. The device according to claim 8, wherein each of the third adjuster output signal and the fourth adjuster output signal is a digital signal.

12. The device according to claim 8, wherein:
a phase and an amplitude of the first adjuster output signal are indicative of beamforming for the TX signal in the first frequency band to be transmitted by a first antenna element,
a phase and an amplitude of the second adjuster output signal are indicative of beamforming for the TX signal in the second frequency band to be transmitted by the first antenna element,
a phase and an amplitude of the third adjuster output signal are indicative of beamforming for the TX signal in the first frequency band to be transmitted by a second antenna element, and
a phase and an amplitude of the fourth adjuster output signal are indicative of beamforming for the TX signal in the second frequency band to be transmitted by the second antenna element.

13. The device according to claim 12, wherein each of the beamforming for the TX signal in the first frequency band to be transmitted by the first antenna element, the beamforming for the TX signal in the second frequency band to be transmitted by the first antenna element, the beamforming for the TX signal in the first frequency band to be transmitted by the second antenna element, and the beamforming for the TX signal in the second frequency band to be transmitted by the second antenna element is beamforming along a first plane of a pair of a horizontal plane and a vertical plane for the TX signal.

14. The device according to claim 8, further comprising:
a first digital upconverter (DUC), to perform digital upconversion to covert the first adjuster output to a first upconverted adjuster output; and
a second DUC, different from the first DUC, to perform digital upconversion to covert the second adjuster output to a second upconverted adjuster output,
wherein the first combiner is to combine a signal indicative of the first upconverted adjuster output and a signal indicative of the second upconverted adjuster output into the first composite TX signal.

15. The device according to claim 14, wherein the first composite TX signal is an intermediate frequency (IF) digital signal.

16. The device according to claim 8, wherein each of the first adjuster input signal, the first adjuster output signal, the second adjuster input signal, and the second adjuster output signal is a baseband signal.

17. A method of operating a beamforming device for a cellular radio frequency (RF) antenna apparatus, the method comprising:
- generating a first adjuster output signal by modifying one or more of a phase and an amplitude of a first adjuster input signal, where the first adjusted input signal is indicative of a transmit (TX) signal in a first frequency band;
- generating a second adjuster output signal by modifying one or more of a phase and an amplitude of a second adjuster input signal, where the second adjuster input signal is indicative of a TX signal in a second frequency band;
- performing digital upconversion to covert the first adjuster output to a first upconverted adjuster output;
- performing digital upconversion to covert the second adjuster output to a second upconverted adjuster output; and
- combining a signal indicative of the first adjuster output and a signal indicative of the second adjuster output into a composite TX signal,
- where an RF signal based on the composite TX signal is to be wirelessly transmitted by an antenna element.

18. The method according to claim 17, further comprising:
- using one or more antenna elements of the RF antenna apparatus to wirelessly transmit the RF signal based on the composite TX signal.

19. The method according to claim 17,
- wherein combining the signal indicative of the first adjuster output and the signal indicative of the second adjuster output includes combining a signal indicative of the first upconverted adjuster output and a signal indicative of the second upconverted adjuster output.

* * * * *